United States Patent
Yao et al.

(10) Patent No.: US 6,813,670 B1
(45) Date of Patent: Nov. 2, 2004

(54) AUTOMATIC SERVER-SIDE PLUG-AND-PLAY WITHOUT USER INTERVENTION

(75) Inventors: Baogang Yao, Kirkland, WA (US); Raju Gulabani, Redmond, WA (US); Brandon L. Watson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 09/681,139

(22) Filed: Jan. 22, 2001

Related U.S. Application Data

(60) Provisional application No. 60/235,293, filed on Sep. 26, 2000.

(51) Int. Cl.[7] .............................. G06F 13/00; G06F 9/24
(52) U.S. Cl. ............................ 710/302; 713/1; 719/327
(58) Field of Search ................................ 710/260, 302, 710/315, 316, 104, 8; 709/229, 223, 250, 218, 220; 713/1, 200; 707/1; 358/474; 717/178

(56) References Cited

U.S. PATENT DOCUMENTS

| | | | | |
|---|---|---|---|---|
| 5,655,148 A | * | 8/1997 | Richman et al. | 710/8 |
| 5,734,831 A | * | 3/1998 | Sanders | 709/223 |
| 5,787,247 A | * | 7/1998 | Norin et al. | 709/220 |
| 5,881,252 A | * | 3/1999 | Sahgal et al. | 710/104 |
| 5,931,935 A | * | 8/1999 | Cabrera et al. | 710/260 |
| 5,956,487 A | * | 9/1999 | Venkatraman et al. | 709/218 |
| 6,009,480 A | * | 12/1999 | Pleso | 710/8 |
| 6,085,249 A | * | 7/2000 | Wang et al. | 709/229 |
| 6,195,650 B1 | * | 2/2001 | Gaither et al. | 707/1 |
| 6,202,147 B1 | * | 3/2001 | Slaughter et al. | 713/1 |
| 6,205,505 B1 | * | 3/2001 | Jau et al. | 710/315 |
| 6,263,387 B1 | * | 7/2001 | Chrabaszcz | 710/302 |
| 6,269,481 B1 | * | 7/2001 | Perlman et al. | 717/178 |
| 6,301,665 B1 | * | 10/2001 | Simonich et al. | 713/200 |
| 6,345,319 B2 | * | 2/2002 | Lin et al. | 710/8 |
| 6,363,452 B1 | * | 3/2002 | Lach | 710/316 |
| 6,405,145 B1 | * | 6/2002 | Rust et al. | 702/91 |
| 6,470,397 B1 | * | 10/2002 | Shah et al. | 709/250 |
| 6,473,854 B1 | * | 10/2002 | Fleming, III | 713/1 |
| 6,509,981 B1 | * | 1/2003 | Shih | 358/474 |

OTHER PUBLICATIONS

Web page : Last updated Feb. 28, 2000. Web address : http://www.microsoft.com/windows2000/en/server/help/increased_availability.htm, published by Microsoft Corporation.*

Plug and Play Parallel Port Devices specification, Microsoft Corporation, Version 1.0b, Mar. 15, 1996.

* cited by examiner

Primary Examiner—Glenn A. Auve
Assistant Examiner—Christopher E. Lee
(74) Attorney, Agent, or Firm—Leydig, Voit & Mayer, Ltd.

(57) ABSTRACT

Automatic server-side plug-and-play without user intervention is disclosed. An automatic plug-and-play component residing on the server is designed to detect connection and disconnection of a device to a port. Without user intervention, the component automatically installs an appropriate driver for the device upon connection of the device to the port. The device is then accessible by clients served by the server. Also without user intervention, the component automatically uninstalls the driver upon disconnection of the device from the port. The device is then inaccessible by the clients.

6 Claims, 6 Drawing Sheets

AUTOMATIC SERVER-SIDE PLUG-AND-PLAY WITHOUT USER INTERVENTION

CROSS REFERENCE TO RELATED APPLICATIONS

This application claims the benefit of and priority to the previously filed provisional application entitled "Automatic Server-Side Plug-and-Play Without User Intervention," filed Sep. 26, 2000, and assigned Ser. No. 60/235,293.

BACKGROUND OF INVENTION

The invention relates generally to plug-and-play of devices, and more particularly to such plug-and-play that is automatic and performed without user intervention.

Users commonly add new devices to their computers. For example, a user may purchase a new printer and connect it to his or her computer. In the past, the user would have to manually install an appropriate device driver so that the programs running on the computer could utilize the new device. This resulted in a potentially confusing and laborious process, especially for novice users. The user first may have had to initially start the device driver installation process. The user may then also have had to select the exact device for which he or she is installing a device driver. Finally, the user may have had to select an appropriate device driver for the device, from a number of different choices. Failure to perform any of these steps correctly may have likely resulted in the new device not working properly with the user's computer.

To ameliorate this problem, the concept of plug-and-play has become popular. Generally, and in a non-restrictive manner, plug-and-play is the process by which a computer detects the presence of new devices connected thereto, and automatically installs appropriate device drivers for the new devices. Users typically do not have to manually start the device driver installation process, as they had to before the advent of plug-and-play. Furthermore, the users do not have to select the exact device they are trying to install a device for, because the computer detects the device for them. Finally, desirably the computer also selects the most appropriate device driver for the users. Plug-and-play is generally known in the art. For example, plug-and-play for parallel port printer devices is described in the reference "Plug and Play Parallel Port Devices," version 1.0b, Mar. 15, 1996, and available from the web site www.Microsoft.com.

However, plug-and-play as it exists in the prior art has several disadvantages. First, it requires user intervention. When a new device is connected to a computer, the user is typically required to interact with the computer in order for a device driver for the device to be successfully installed. This interaction may be, for example, the user having to provide confirmation to the computer several times throughout the device driver installation process. Second, plug-and-play is frequently a one-way process, only automatically detecting and installing device drivers for new devices connected to the computer. When devices are disconnected from the computer, the device drivers are frequently not automatically uninstalled. This can cause errors to result, since the programs running on the computer have access to the devices as if they were still connected to the computer.

Because of these disadvantages, plug-and-play as it exists in the prior art is suitable only for client usage, and not server usage. A client is typified by a computer that an end user actively uses. To this extent, it may be acceptable for the end user to have to participate in the device driver installation process, since the end user is usually aware that a new device has been connected to his or her computer. Likewise, because the end user is usually aware when a device has been disconnected from the computer, he or she is likely not to try to access the device from programs running on the computer, even though the programs ostensibly provide such access.

A server, however, may not have an active user, and may have devices connected to it for the benefit of the users of the clients connected to the server. These devices may include, for example, scanners, printers, and fax machines. When a new device is connected to the server, there may not be a knowledgeable user present to correctly participate in the device driver installation process. Furthermore, when a device is disconnected from the server, the end users are likely not to be aware of this, since the server is usually located out of eye's sight from the clients. For these and other reasons, therefore, there is a need for the present invention.

SUMMARY OF INVENTION

The invention relates to automatic server-side plug-and-play without user intervention. An automatic plug-and-play component residing on the server is designed to detect connection and disconnection of a device to a port. The port may be, for example, the parallel port, a serial port, or another type of port. The device may be, for example, a printer, a scanner, a fax machine, or another type of device. Without user intervention, the component automatically installs an appropriate driver for the device upon connection of the device to the port. The device is then accessible by clients served by the server. That is, the device is shared among the clients. Similarly, without user intervention, the component automatically uninstalls the driver upon disconnection of the device from the port. The device is then inaccessible by the clients.

The invention provides for advantages not found within the prior art. Unlike the user-involved, client-centric plug-and-play of the prior art, the invention's plug-and-play is user-independent and server-specific. A device that is connected to the server has a device driver installed for it automatically, without the user having to provide any confirmations or otherwise having to interact in the process. When the device is disconnected, the device driver for the device is automatically uninstalled. This means that users do not have subsequent access to the device from their clients, preventing possible errors from occurring.

Servers, machine-readable media, computer programs, and state transition systems of varying scope are encompassed by the invention. Other aspects, embodiments and advantages of the invention, beyond those described here, will become apparent by reading the detailed description and by referencing the drawings.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Overview

Figure 1:
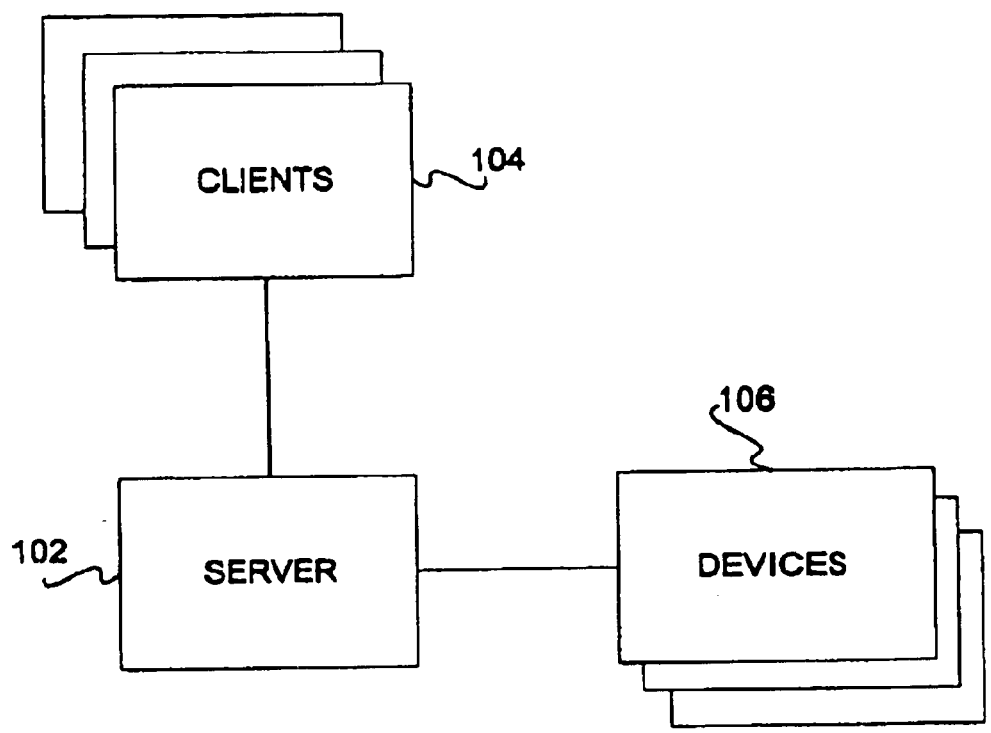
FIG. 1 is a diagram of a system having a server with a number of devices connected thereto, for access by clients also connected to the server.

FIG. 1 shows a diagram of a system 100 in conjunction with which server-side plug-and-play according to the invention can be implemented. The server 102 is communicatively coupled via a network to clients 104. The server 102 has directly connected thereto a number of devices 106. The devices are specifically connected to various ports of the server 102. As an example, the devices 106 can include a printer that is connected to the parallel port of the server 102. According to the invention, the devices 106 are automatically detected by the server 102 when connected thereto, and appropriate drivers are automatically installed for the devices 106 without user intervention. The clients 104 can then access the devices 106 connected to the server 102, which is referred to as device sharing. When the devices 106 are disconnected from the server 102, the server 102 detects this as LD well, and automatically uninstalls the drivers that were previously installed without user intervention. The clients 104 are subsequently unable to access the devices 106 when they are disconnected from the server 102.

Server-Side Automatic Plug-and-Play Without User Intervention

Figure 2:
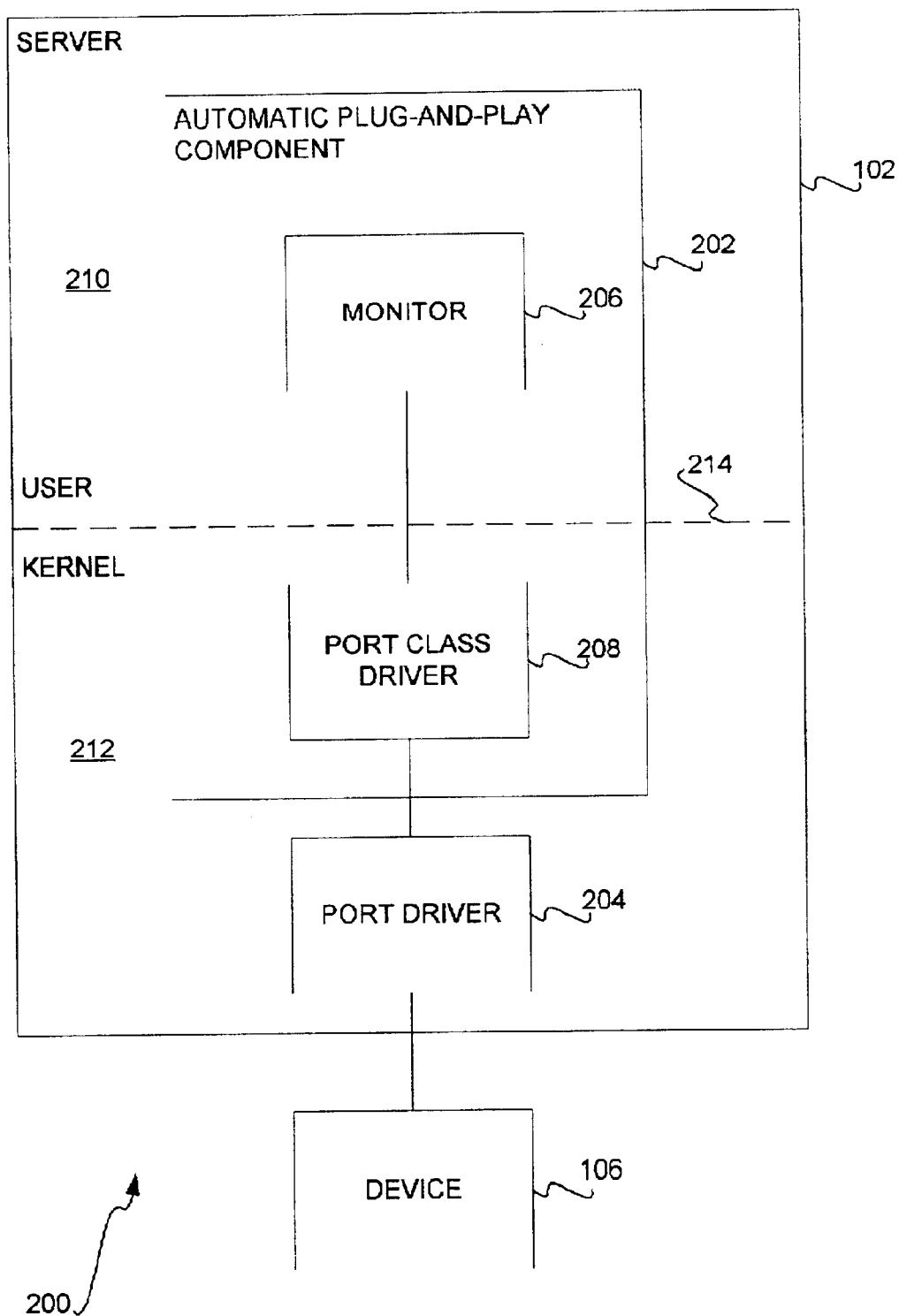
FIG. 2 is a diagram of a server having plug-and-play capability, according to an embodiment of the invention.

The automatic detection of device connection to a server, resulting in the automatic installation of appropriate drivers, and the automatic detection of device disconnection from the server, resulting in the automatic uninstallation of the drivers, is referred to as automatic server-side plug-and-play without user intervention. This plug-and-play is described in detail in this section of the detailed description. FIG. 2 shows a diagram 200 of the server 102 by which the server 102 has such plug-and-play capability according to one embodiment of the invention. The server 102 has connected to a port thereof a device 106. The device 106 is also referred to as a port device.

The port can be a parallel port, a serial port, or another type of port. Where the port is a serial port, it may have a Universal Serial Bus (USB) form factor, an IEEE 1394 form factor, or another type of form factor. The device 106 can be a printer, a scanner, a fax machine, a digital camera, a multi-function device (MFD) having printing, scanning, and/or faxing capabilities, or another type of device. The server 102 itself may be a server appliance. A server appliance is a server that typically has a reduced set of functional capabilities and is designed for easy installation and maintenance. The server appliance may lack a dedicated keyboard, monitor, and/or pointing device, such that the appliance is accessed through a client connected to the same network as the appliance.

The server 102 has its memory divided into two modes, a user mode 210, and a kernel mode 212. The kernel mode 212 includes protected memory of the server 102. This mode is the portion of the system that manages memory, files, and peripheral devices, maintains the time and date, launches applications, and allocates system resources. The user mode 210 includes unprotected memory of the server 102. This mode is the portion of the system in which applications are usually run.

The server 102 includes a port driver 204 for the port to which the device 106 can be connected. The port driver 204 resides in the kernel mode 212. The port driver 204 is the low-level driver that passes signals from the server 102 to the device 106. It also passes signals from the device 106 to the server 102. The port driver 204 is not specific to the automatic plug-and-play of the invention, but rather is the low-level driver that is used by any component within the server 102 to communicate with the device 106. A driver is generally a device-specific control program that enables the server 102 to work with a particular device. Because the driver handles device-specific features, the server 102 is freed from the burden of having to understand and support the needs of individual hardware devices.

The server 102 has an automatic plug-and-play component 202. The component 202 can be implemented as one or more software programs, objects, or other type of software modules. The component 202 embodies the plug-and-play functionality of the invention that has been described. The component 202 without user intervention automatically installs an appropriate driver for the device 106 upon connection of the device 106 to a port of the server 102. This results in the device 106 being accessible by clients communicatively coupled to the server 102. The component 202 also without user intervention automatically uninstalls the driver for the device 106 when the device 106 is disconnected from the port of the server 102. This results in the device 106 being inaccessible by the clients.

The component 202 has at least two constituent parts, divided between the user mode 210 and the kernel mode 212 as indicated by the dotted line 214. The monitor 206 of the component 202 resides in the user mode 210, whereas the port class driver 208 of the component 202 resides in the kernel mode 212. The monitor 206 is the part of the component 202 that embodies the logic to accomplish the plug-and-play function of the invention that has been described. The port class driver 208 facilitates communication between the monitor 206 and the port driver 204. The port class driver 208 passes signals from the monitor 206 to the port driver 204 that are meant for the device 106, and passes signals from the port driver 204 to the monitor 206 that emanate from the device 106.

The monitor 206 can be implemented as a service on the server 102, which is a type of computer program that generally is meant to support other programs that are directly accessed by the end user. The port class driver 208 is a higher-level device driver than the port device 204, which embodies the driver functionality specifically for automatic plug-and-play. There can be more than one port on the server 212 that has automatic plug-and-play functionality, including more than one port of the same type. In such a case, there is a corresponding port driver 204 for each of these ports, and a port class driver 208 for each port driver 204. Only one port driver 204 and only one port class driver 208 are shown in FIG. 2 for illustrative clarity.

The automatic plug-and-play of the server 102 works as follows. The monitor 206 periodically checks the status of the port of the server 102, to determine when a device is connected to or disconnected from the port. Specifically, the monitor 206 requests from the port class driver 208 what is referred to as a plug-and-play identifier, or ID, of the device 106 connected to the port. If there is no device 106 connected to the port, then no ID will be returned. The plug-and-play identifier is a unique code that plug-and-play-compatible devices provide, so that they can be identified by the computers to which they are connected. The port class driver 208 specifically exists to provide an easy way for the monitor 206, or other components, to obtain the plug-and-play identifier without having to negotiate with the port driver 204 itself. The port class driver 208 thus abstracts the port driver 204, so that the plug-and-play identifier can be obtained without having to resort to the lower-level port driver 204.

When the device 106 is plugged into the port of the server 102, the monitor 206 obtains its plug-and-play identifier in response to one of its periodic queries to the port class driver 208. The port class driver 208 obtains the plug-and-play identifier by negotiating directly with the port driver 204. The monitor 206 installs an appropriate driver for the device 106 based on the identifier of the device 106. Specifically, the monitor 206 can search its own list of drivers for a driver that corresponds to the device 106, based on the identifier. Alternatively, the monitor 206 can download an appropriate driver, based on the identifier of the device 106, from the Internet. Once an appropriate driver is found, then the driver is installed on the server 102. The device 106 may also be shared with clients connected to iii the server 102, for example, by calling a sharing application programming interface (API) designed for this purpose. Where no corresponding driver to the identifier of the device 106 is found, or where the device 106 has no such identifier, a generic driver may be installed for the device 106.

When the device 106 is unplugged from the port of the server 102, it no longer returns the plug-and-play identifier in response to the periodic querying by the monitor 206. In response to this condition, the monitor 206 automatically uninstalls the driver that had been installed for the device 106 from the server 102. The monitor 206 may also call the sharing API to turn off sharing of the device 106, so that it is no longer accessible by the clients connected to the server 102.

Figure 3:
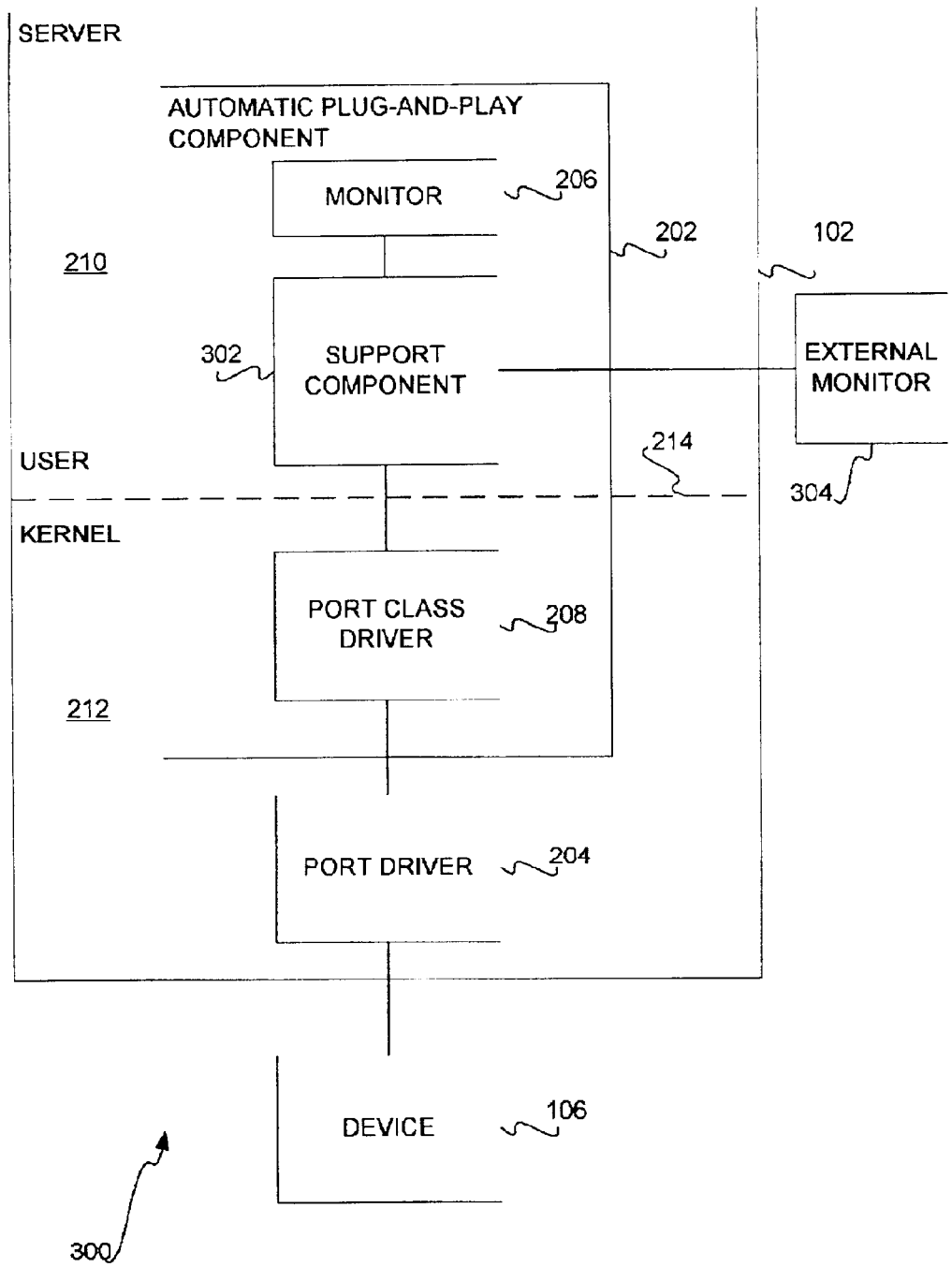
FIG. 3 is a diagram of the server of FIG. 2 in more detail, according to an embodiment of the invention.

FIG. 3 shows a diagram 300 of the server 102 by which the server 102 has automatic plug-and-play capability according to another embodiment. The difference in the automatic plug-and-play component 202 of FIG. 3 and that of FIG. 2 is the presence of a support component 302 between the monitor 206 and the port class driver 208. The support component 302 provides a higher abstraction still of the driver functionality of the port class driver 208 for plug-and-play purposes. The monitor 206 functions as has been described, but interacts with the support component 302 instead of the port class driver 208. In particular, the support component 302 passes signals from the monitor 206 to the port class driver 208, and vice-versa. The support component 302 resides in the user mode 210 of the server 102.

The presence of the support component 302 allows for external monitoring of device connectivity to ports of the server 102 to accomplish automatic plug-and-play. The external monitoring can be performed by the external monitor 304, which is a software component that resides outside of the server 102. The external monitor 304 performs the same functionality as the monitor 206 that is internal to the server 102, except that the external monitor 304 does not reside within the server 102. The external monitor 304 may, for example, send signals to and receive signals from the support component 302 from over the same network that connects the server 102 with the clients connected to the server 102. Thus, the support component can send signals to the external monitor 304 from the port class driver 208, and vice-versa. The external monitor 304 may be a web component, which is a software component that communicates via the HyperText Transport Protocol (HTTP).

Figure 4:
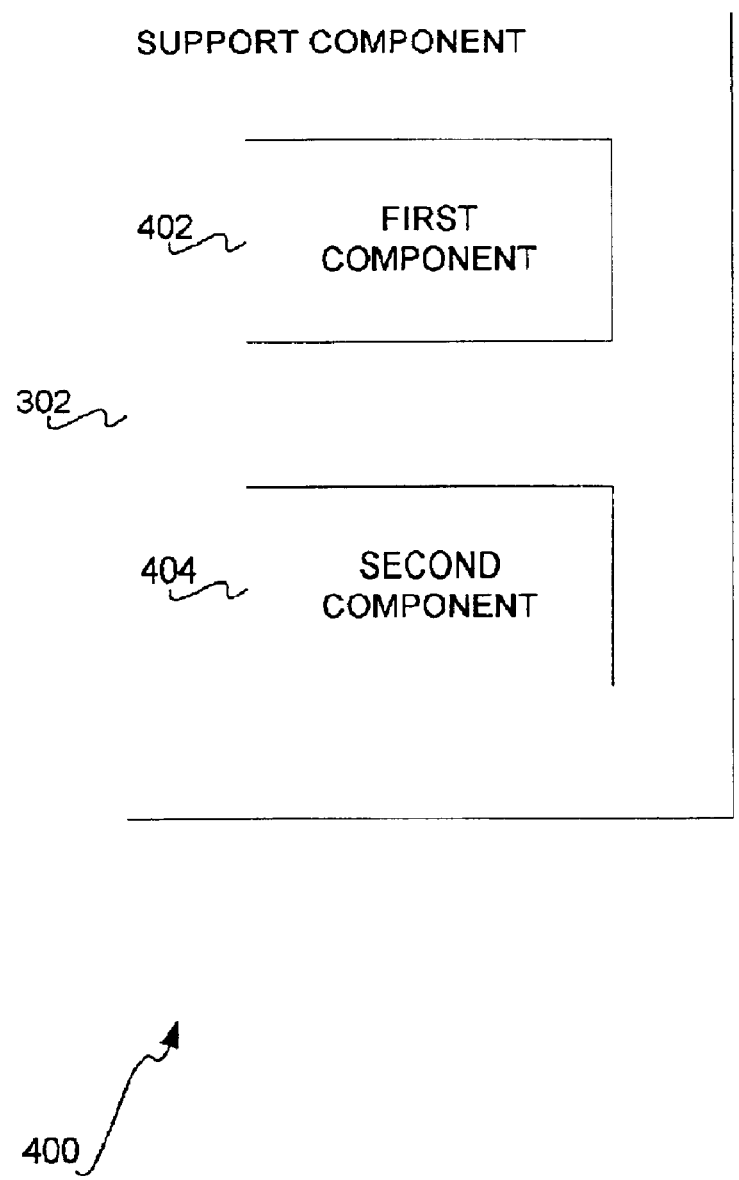
FIG. 4 is a diagram of the support component of FIG. 3 in more detail, according to an embodiment of the invention.

A more detailed view of the support component 302 is shown in the diagram 400 of FIG. 4. The support component 302 specifically has a first component 402, and a second component 404. The monitor 206 or the external monitor 304 initially calls the first component 402. The first component 402 determines the number of relevant ports on the server 102. For each port, it instantiates a second component 404. Only one second component 404 is shown in FIG. 4 for illustrative clarity. The second component 404 acts as the abstraction of the port class driver for a given port, and performs this abstracted functionality of the support component 302 as has been described. The second component 404, in other words, is designed to pass signals from the monitor 206 and the external monitor 304 to a corresponding port class driver 208, and vice-versa. Each of the components 402 and 404 can be a software object, or another type of software module.

The embodiment of the invention described in conjunction with FIGS. 3 and 4 operates as follows. When the monitor 206 or the external monitor 304 is first started, it instantiates and calls the first component 402 of the support component 302. The first component 402 delineates the number of ports on the server 102, and instantiates a second component 404 for each port. The monitor 206 or the external monitor 304 periodically checks the status of each port by calling the appropriate second component 404, to determine the plug-and-play identifier of the device connected to the port, if any. The monitor 206 and the external monitor 304 then function as has been described, automatically installing a device driver for and sharing a new device connected to a port, and automatically uninstalling the driver and unsharing the device when the device is disconnected from the port.

Specific Implementation of Components

As has been described, automatic server-side plug-and-play without user intervention is accomplished by four unique components. A first component is a monitor, such as the monitor 206 or the external monitor 304. The second and third components are the first and the second components 402 and 404 within the support component 302. The fourth component is the port class driver 208. The other component that has been described, the port driver 204, is used by the invention, but is a component that already exists on the server 102, and is not specific to the invention. Each of the four unique components of the invention is now described in more particularity as to one specific implementation.

Implementation of the Monitor 206 and External Monitor 306

Figure 5:
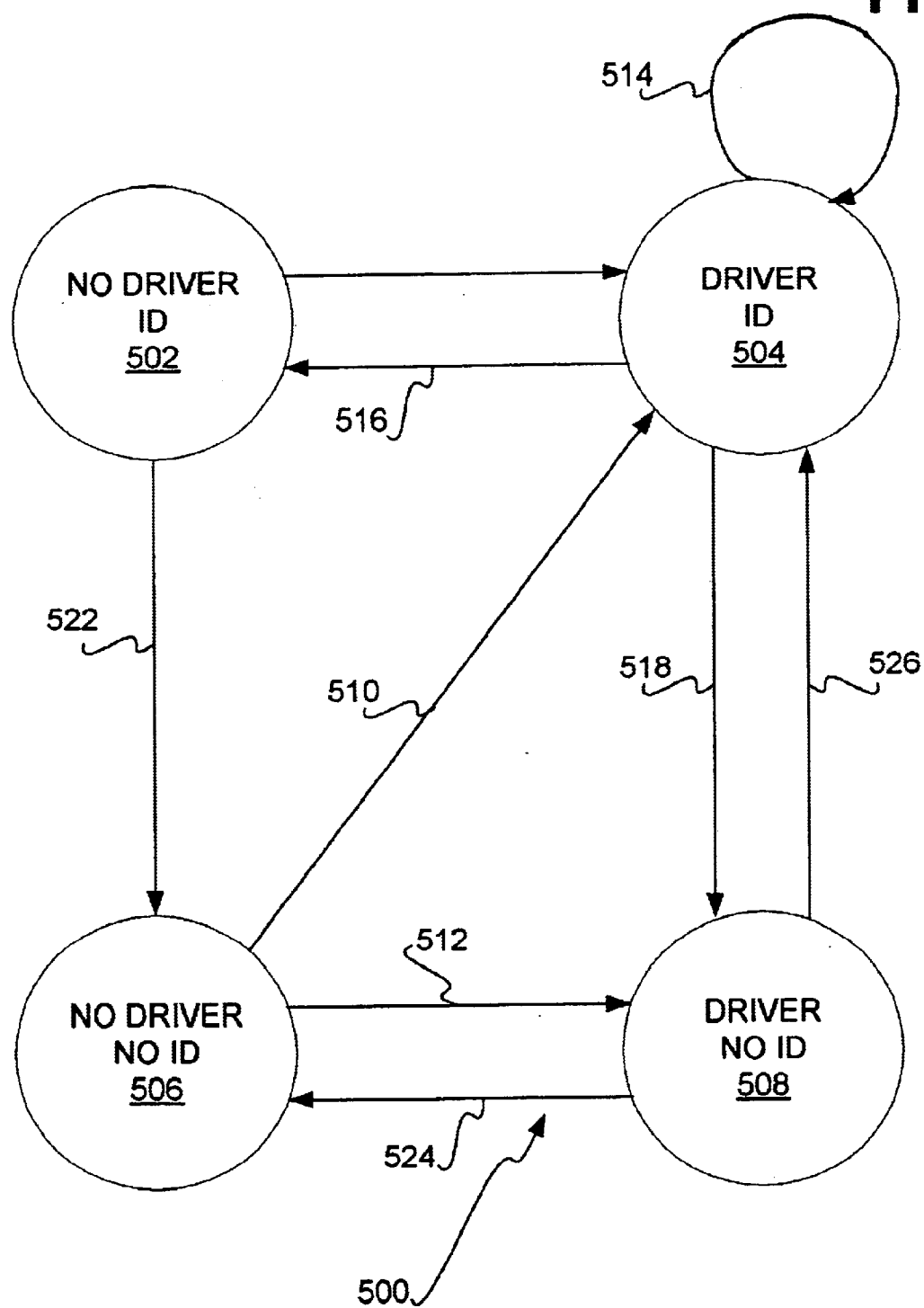
FIG. 5 is a state transition diagram showing how the plug-and-play logic can be implemented in one embodiment of the invention.

With respect to the monitor 206 and the external monitor 306, each monitor can be said to incorporate a monitoring logic that encompasses its functionality via a state-transition system. Such a state transition system is shown in the diagram 500 of FIG. 5. There are four states in the diagram 500, a first state 502, a second state 504, a third state 506, and a fourth state 508. The first state 502 corresponds to the situation where no driver has been installed for a device on a port, but a plug-and-play identifier has been detected from the port. The second state 504 corresponds to the situation where a driver has been installed for a device, and a plug-and-play identifier has been detected. The third state 506 is the initial state, and corresponds to the situation where no driver has been installed, and no identifier has been detected. Finally, the fourth state 508 corresponds to the situation where a driver has been installed, but no identifier has been detected.

The monitoring logic of the monitor 206 and the external monitor 306 starts at the third state 506. When a plug-and-play identifier has been detected, there is a transition 510 from the third state 506 to the second state 504. A driver corresponding to the plug-and-play identifier is installed. If a device driver is manually installed, then there is a transition 512 from the third state 506 to the fourth state 508. At the second state 504, if a new plug-and-play identifier is detected, then there is a transition 514 back to the second state 504, such that a new device driver, corresponding to the new identifier, is installed. Also from the second state 504, when the device is disconnected, the fourth state 508 is transitioned to as the transition 518, since an identifier is no longer detected. The second state 504 can transition to the first state 502, indicated by the transition 516, if the device driver is manually uninstalled. From the first state 502, when an identifier is no longer detected, there is a transition 522 to the third state 506. Further, the first state 502 is transitioned to the second state, indicated by a transition 520, when a manual driver installation is detected. From the fourth state 508, the installed driver can be manually uninstalled to reach the third state 506 via a transition 524. Also from the fourth state 508, if an identifier is detected, then a driver corresponding to this identifier is installed, and the third state is transitioned to, via a transition 526.

Implementation of the Port Class Driver 208

With respect to the port class driver 208, one specific implementation is as follows. This implementation is with respect to the situation where the port class driver 208 is specifically a parallel port driver for the parallel port. The port class driver 208 is implemented as a parallel class driver that communicates with a parallel port device through a share mode of the port driver 204. The port class driver 208 supports the following standard parallel input/output control (IOCTL) codes. It does not support any other standard parallel input/output (I/O) operations besides the IOCTL listed below.

The first IOCTL code is known as IOCTL_PAR_QUERY_INFORMATION. This code returns the status of the parallel port device represented by the input device object. The input is referred to as Parameters.DeviceIoControl.OutputBufferLength, which indicates the size in bytes of the buffer. The output returned is the status of the device, which is one of PARALLEL_PAPER_EMPTY, PARALLEL_OFF_LINE, PARALLEL_POWER_OFF, PARALLEL_NOT_CONNECTED, PARALLEL_BUSY, or PARALLEL_SELECTED. With respect to an I/O status block, an information field is set to sizeof(UCHAR) when the Status field is set to STATUS_SUCCESS. Otherwise, the Information field is set to zero, and the Status field can be set to STATUS_CANCELLED, STATUS_PENDING, or STATUS_BUFFER_TOO_SMALL.

The second IOCTL code is known as IOCTL_PAR_QUERY_DEVICE_ID. This code returns the plug-and-play device identifier for the device, which is also referred to as the IEEE 1284 device identifier for the device. The input is referred to as Parameters.DeviceIoControl.OutputBufferLength, which indicates the size in bytes of the buffer. A device identifier can be up to 64 kilobytes. An application can use IOCTL_PAR_QUERY_DEVICE_ID_SIZE to determine the size of the identifier for a particular device. The output returned is the device identifier. With respect to an I/O status block, when the status is set to STATUS_SUCCESS, the driver sets the information field to the size of the returned device identifier. When Status is set to indicate an error, such as STATUS_IO_DEVICE_ERROR or STATUS_BUFFER_TOO_SMALL, the driver sets the information field to zero.

The third IOCTL code is known as IOCTL_PAR_QUERY_DEVICE_ID. This code returns the size of the IEEE 1284 device identifier for the device, that is, the plug-and-play identifier. The input is referred to as Irp->AssociatedIrp.SystemBuffer of type PPAR_DEVICE_ID_SIZE_INFORMATION, to receive the identifier size. The output returned is the size of the device identifier, at Irp->AssociatedIrp.SystemBuffer. With respect to an I/O status block, when the status is set to STATUS_SUCCESS, the driver sets the Information field to size of (PPAR_DEVICE_ID_SIZE_INFORMATION). When Status is set to indicate an error, such as STATUS_IO_IO_DEVICE_ERROR, the driver sets information field to zero.

Implementation of the First Component 402 of the Support Component 302

With respect to the first component 402 of the support component 302, one specific implementation is as follows. The first component 402 can be a Component Object Model (COM) component. The first component 402 in this specific implementation is referred to as the ParClass component. Furthermore, this implementation is specific to the parallel port only.

The first component 402 has the following interface.

interface IParClass: IDispatch

[

[propget, id(1), helpstring("property dNumOfPorts")]
    HRESULT dNumOfPorts ([out, retval] short *pVal);

[id(2), helpstring("method OpenPort")] HRESULT
    OpenPort([in]short dPortNo, [out, retval]IDispatch**
    ppDispatch);

]

The property dNumOfPorts indicates the number of parallel ports on the server 102.

The component 402 exposes one method, as follows.

OpenPort(short dPortNo, IDispatch** ppDispatch)

This method will create and initialize a ParPort object.

Parameters:

dPortNo: Parallel Port No, for example, dPortNo=1 stands for LPT1 ppDispatch: pointer to the IDispatch interface of the newly created ParPort object The ParPort object referred to is the second component 404. That is, instances of the component 404 are created through the OpenPort method of the first component 402.

Implementation of the Second Component 404 of the Support Component 302

With respect to the second component 402 of the support component 302, one specific implementation is as follows. The second component 404 can be a Component Object Model (COM) component. The second component 404 in this specific implementation is referred to as the ParPort component. Furthermore, this implementation is specific to the parallel port only.

The second component 404 has the following interface.

Interface IparPort IDispatch

```
{
[propget, id(1), helpstring("property bstrMfg")]
HRESULT bstrMfg([out, retval] BSTR *pVal);
[propget, id(2), helpstring("property bstrModel")]
HRESULT bstrModel([out, retval] BSTR *pVal);
[propget, id(3), helpstring("property bstrPnpid")]
HRESULT bstrPnpId([out, retval] BSTR *pVal):
[propget, id(4), helpstring("property bstrCid")]
HRESULT bstrCid([out, retval] BSTR *pVal);
[id(5), helpstring("method NegotiateId")]
HRESULT NegotiateId( );
[id(6), helpstring("method GetStatus")]
HRESULT GetStatus([out, retval]VARIANT* pVal);
};
```

The property bstrMfg indicates the manufacturer of the device connected to the parallel port. The property bstrModel indicates the model of the device. The property bstrPnpId indicates the plug-and-play identifier for the device, and the property bstrCid indicates other compatible plug-and-play identifiers for the device.

The component 404 exposes two methods, as follows.

HRESULT NegotiateId( )
HRESULT GetStatus([out, retval]Variant *pVal)

The NegotiateId( ) method is called to negotiate the plug-and-play identifier from the device. This method is called at least once before all the properties are valid. If the method fails, the properties become NULL strings. The GetStatus method is called to retrieve the currently parallel port device status. The returned data type is VT_I1 (one byte). The actual status is obtained by performing a bit operation, based on the following flags.

```
#define PARALLEL_INIT 0x1#define PARALLEL_
    AUTOFEED 0x2
#define PARALLEL_PAPER_EMPTY 0x4#define
    PARALLEL_OFF_LINE 0x8
#define PARALLEL_POWER_OFF 0x10#define
    PARALLEL_NOT_CONNECTED 0x20
#define PARALLEL_BUSY 0x40#define PARALLEL-
    SELECTED 0x80
```

Example Computerized Device

Figure 6:
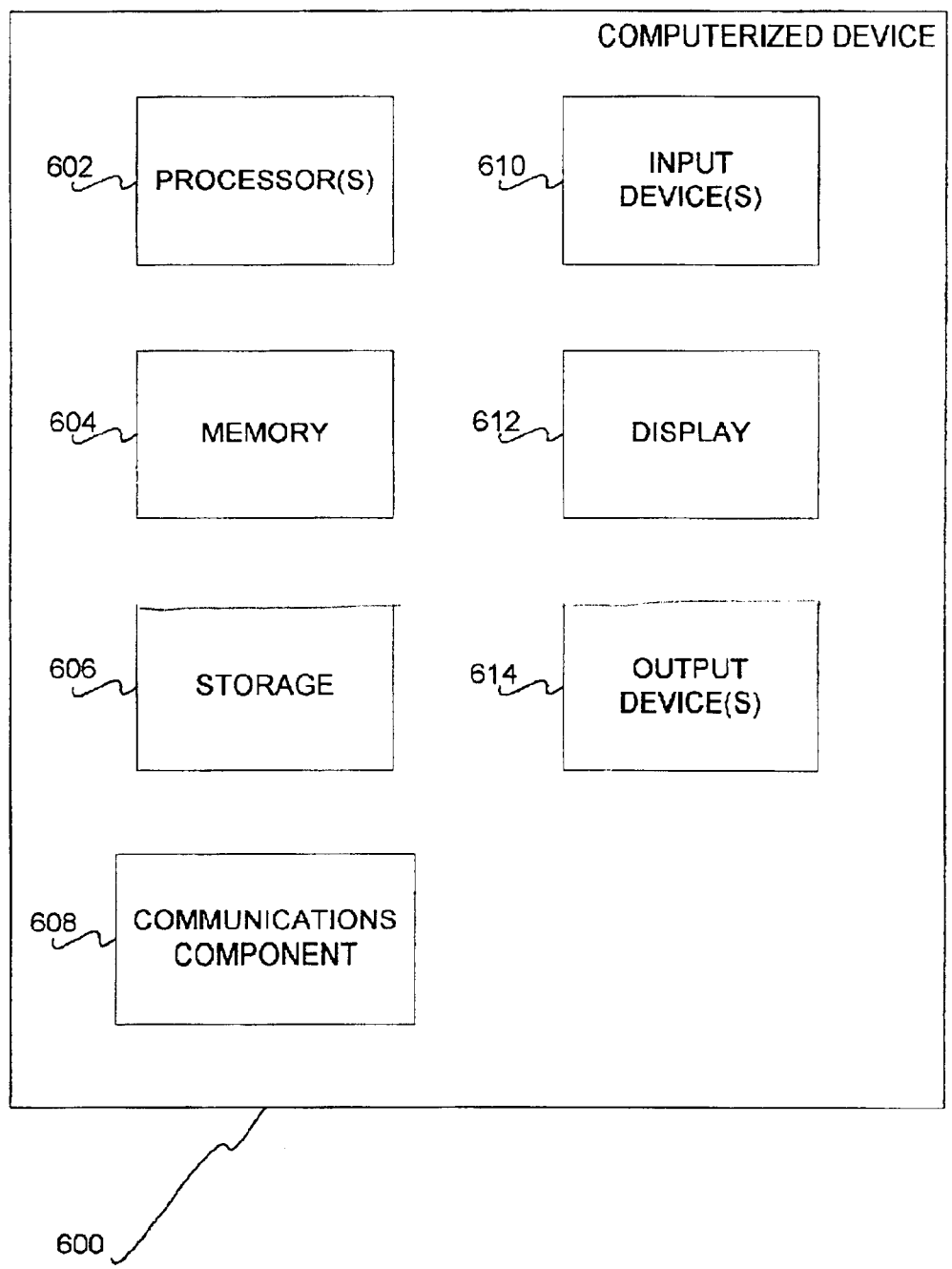
FIG. 6 is a diagram of an example computerized device that can implement the server of the invention.

The diagram of FIG. 6 shows an example computerized device 600 that can implement a server according to the invention. The example computerized device 600 can be, for example, a desktop computer. The invention may be practiced with other computer system configurations as well, including multiprocessor systems, minicomputers, and mainframe computers. The invention may be practiced in distributed computing environments where tasks are performed by remote processing devices that are linked through a communications network.

The device 600 includes one or more of the following components: processor (s) 602, memory 604, storage 606, a communications component 608, input device(s) 610, a display 612, and output device(s) 614. For a particular instantiation of the device 600, one or more of these components may not be present. For example, a server appliance may not have its own dedicated input device(s) 610, display 612, or output device(s) 614. The description of the device 600 is to be used as an overview of the types of components that typically reside within such a device, and is not meant as a limiting or exhaustive description.

The processor(s) 602 may include a single central-processing unit (CPU), or a plurality of processing units, commonly referred to as a parallel processing environment.

The memory 604 may include read-only memory (ROM) and/or random-access memory (RAM). The storage 606 may be any type of storage, such as fixed-media storage devices and removable-media storage devices. Examples of the former include hard disk drives, and flash or other non-volatile memory. Examples of the latter include tape drives, optical drives like CD-ROM drives, and floppy disk drives. The storage devices and their associated computer-readable media provide non-volatile storage of computer-readable instructions, data structures, program modules, and other data. Any type of computer-readable media that can store data and that is accessible by a computer can be used.

The device 600 operates in a network environment. Examples of networks include the Internet, intranets, extranets, local-area networks (LAN's), and wide-area networks (WAN's). The device 600 may include a communications component 608, which can be present in or attached to the device 600. The component 608 may be one or more of a network card, an Ethernet card, an analog modem, a cable modem, a digital subscriber loop (DSL) modem, and an Integrated Services Digital Network (ISDN) adapter. The input device(s) 610 are the mechanisms by which a user provides input to the device 600. Such device(s) 610 can include keyboards, pointing devices, microphones, joysticks, game pads, and scanners. The display 612 is how the device 600 typically shows output to the user. The display 612 can include cathode-ray tube (CRT) display devices and flat-panel display (FPD) display devices. The device 600 may provide output to the user via other output device(s) 614. The output device(s) 614 can include speakers, printers, and other types of devices.

The state transition systems that have been described can be computer-implemented on the device 600. Such systems are desirably realized at least in part as one or more programs running on a computer. These and other programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A machine-readable medium having stored thereon as a computer program for execution by a processor and a monitoring logic for automatic device plug-and-play without user intervention that is implemented as a state transition system comprising:

a first state in which a device driver is not installed and a plug-and-play identifier has been detected from a device connected to a port;

a second state in which the device driver is installed and the plug-and-play identifier has been detected from the device connected to the port;

a third state in which the device driver is not installed and the plug-and-play identifier has not been detected from the device connected to the port; and, a fourth state in which the device driver is installed and the plug-and-play identifier has not been detected from the device connected to the port, wherein the states are transitioned among one another based on a set of transitions comprising:

a first state-to-second state transition based on a device driver installation event;

a first state-to-third state transition based on an event of no detection of the plug-and-play identifier, a second state-to-first state transition based on a device driver uninstallation event;

a second state-to-second state transition based on an event of detection of a new plug-and-play identifier;

a second state-to-fourth state transition based on the event of no detection of the plug-and-play identifier;

a third state-to-second state transition based on an event of detection of the plug-and-play identifier;

a third state-to-fourth state transition based on the device driver installation event;

a fourth state-to-third state transition based on the device driver uninstallation event; and, a fourth state-to-second state transition based on the event of detection of the plug-and-play identifier.

2. The medium of claim 1, wherein the device is a printer, a scanner, a fax machine, a multi-function device (MFD), or a digital camera.

3. The medium of claim 1, wherein the port is a parallel port or a serial port.

4. The medium of claim 3, wherein the serial port has a Universal Serial Bus (USB) form factor or an IEEE1394 form factor.

5. The medium of claim 1, wherein upon connection of the port device to the port, the device driver installation event retrieves a plug-and-play identifier from the device, and selects an appropriate device driver based on the plug-and-play identifier.

6. The medium of claim 5, wherein the device driver installation event includes downloading the appropriate driver from the Internet.

* * * * *